United States Patent [19]

Park

[11] Patent Number: 5,212,550
[45] Date of Patent: May 18, 1993

[54] MUSE/NTSC STANDARD CONVERTER

[75] Inventor: Jeong H. Park, Suwon, Rep. of Korea

[73] Assignee: Samsung Electronics Co., Ltd., Suwon, Rep. of Korea

[21] Appl. No.: 807,444

[22] Filed: Dec. 13, 1991

[30] Foreign Application Priority Data

Jun. 29, 1991 [KR] Rep. of Korea .................... 91-11112

[51] Int. Cl.$^5$ ...................... H04N 7/01; H04N 11/20
[52] U.S. Cl. ..................................... 358/140; 358/11
[58] Field of Search .................. 358/11, 140, 138, 141

[56] References Cited
U.S. PATENT DOCUMENTS 5,070,395 12/1991 Kitaura et al. .................. 358/140 X
5,103,308 4/1992 Asano ................................. 358/140

Primary Examiner—Victor R. Kostak
Attorney, Agent, or Firm—Anderson Kill Olick & Oshinsky

[57] ABSTRACT

A MUSE/NTSC standard converter is disclosed for converting an HDTV broadcast signal, transmitted with the MUSE standard, to be watched through an NTSC standard television set. The converter provides two modes through a filter for converting a number of lines, united with one hardware, different from the prior art, using each of the hardwares to convert into a zoom-up mode and a wide mode.

5 Claims, 5 Drawing Sheets

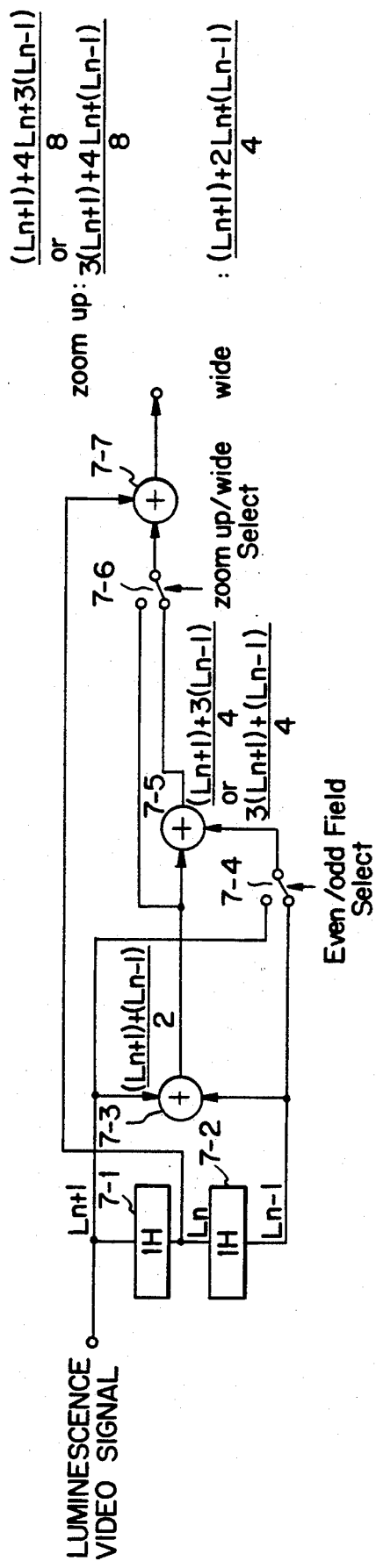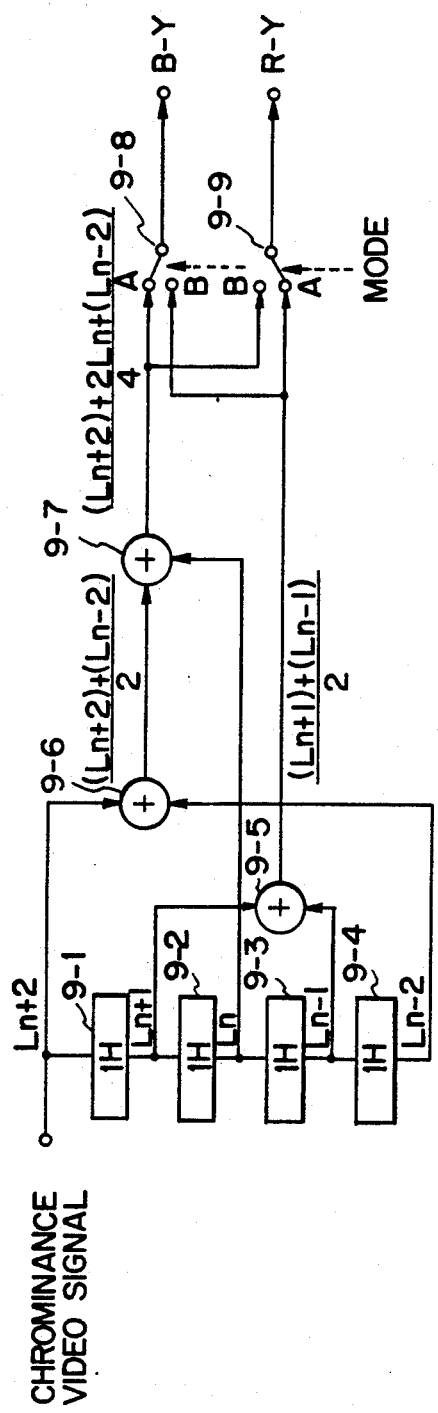
FIG. 3
FIG. 4

ZOOM-UP MODE CONVERSION        WIDE MODE CONVERSION

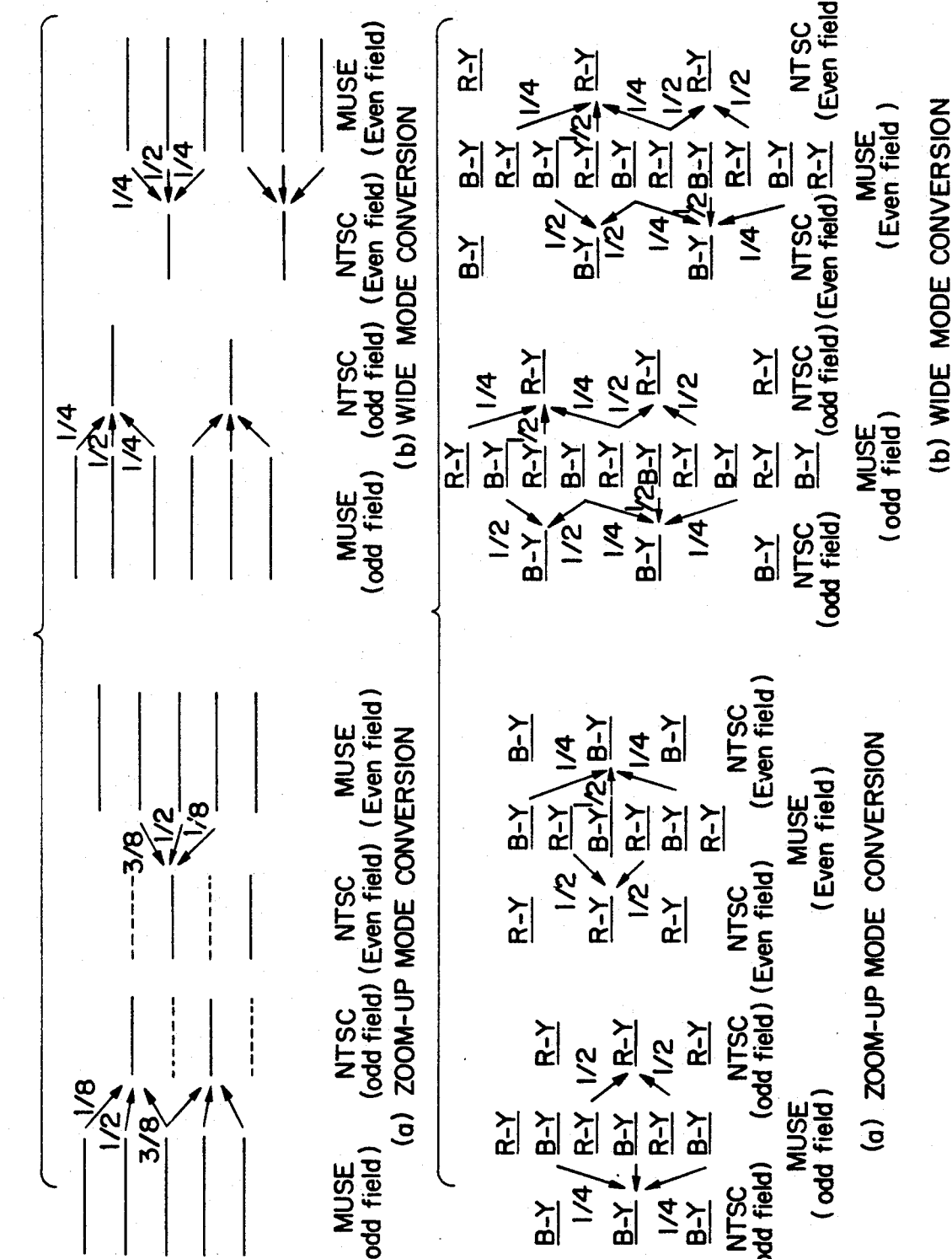

MUSE/NTSC STANDARD CONVERTER

BACKGROUND OF THE INVENTION

The present invention relates to a Multiple Sub-Nyquist Sampling Encoding hereinafter called as MUSE/NTSC standard converter for converting a HDTV broadcasting being transmitted with MUSE standard to be watched through the present NTSC standard television set, and particularly to a converter for converting a picture screen of HDTV having aspect ratio of 9 to 16 into that of the present television having aspect ratio of 3 to 4.

In converting a picture screen of a HDTV having aspect ratio of 9 to 16 into that of the present TV having aspect ratio of 3 to 4, the zoom-up mode conversion method and a wide mode conversion method have been used.

In converting into a zoom-up mode, both sides of a picture screen of HDTV is cut off on the order of 30% and only 70% of center is converted to be watched through NTSC standard TV. In converting into a wide mode, a HDTV video image having aspect ratio of 9 to 16 is entirely watched in a picture screen of NTSC standard TV having aspect ratio of 3 to 4 and at the same time, the portion of which video image is not exist in the upper and lower part on a NTSC standard picture screen is watched on the order of 28.6%.

As shown in FIG. 1, a MUSE/NTSC standard converter according to the prior art primarily converts a HDTV video image of 1125 lines into video image of 525 lines using a vertical interpolation filter for a zoom-up mode in order to provide both of a zoom-up mode conversion in which both sides of a picture screen of HDTV is cut off on the order of 30% and only 70% of center is converted to be watched through NTSC standard TV and a wide mode conversion in which a HDTV video image having aspect ratio of 9 to 16 is entirely watched in a picture screen of NTSC standard TV having aspect ratio of 3 to 4 and at the same time, the non-marked portion is exist on the order of 28.6% in the upper and lower part on a NTSC standard picture screen.

Secondarily, the picture screen converted into 525 lines is interpolated using a vertical interpolation filter for a wide mode and then vertically compressed into the 350 lines, thereby generating a picture screen converted into a wide mode.

As aforesaid, the MUSE/NTSC standard converter according to the prior art has disadvantages as follows.

Because both of vertical interpolation filters for a zoom-up mode and for a wide mode are used, hardware is increased in quantity. If a picture screen of 1125 lines is directly converted into that of a wide mode, said picture screen having 1125 lines can be converted into that of 375 lines by reducing 1125 lines by a third. However, if a picture screen of 525 lines is converted into that of 350 lines, it is converted by reducing 525 lines by two-third so that a vertical resolution is degraded approximately on the order of 7.5%.

Aforesaid mode conversion technique is disclosed in more detail in Japanese Laid Open Patent Application No. 89-292984.

SUMMARY OF THE INVENTION

It is an object to provide a MUSE/NTSC standard conveter for providing two conversion modes of a zoom-up mode and for a wide mode, which is configured with one hareware instead of each hardwares for a zoom-up mode and for a wide mode.

It is another object to improve the vertical resolution by means of increasing number of vertical scanning lines to be converted in a wide mode.

To obtain the above object, technical means of a MUSE/NTSC television signal converter according to the present invention are as follows.

An analog-digital converter for converting an analog MUSE baseband signal received through a tuner is connected to a deemphasis part for reversely treating deemphasis against the transmission r-treatment and emphasis treatment accomplished before the transmission of a MUSE signal and a synchronizing detector for accurately detecting a synchronizing signal of a MUSE signal, and said deemphasis part and said synchronizing detector are respectively connected to a speed conversion memory and a memory controller for cutting off both sides of a picture screen of a HDTV screen having aspect ratio 9 to 16 to make a NTSC picture screen having aspect ratio of 3 to 4 and reducing the video image processing speed suited to a zoom-up mode if a zoom-up mode and for maintaining a HDTV picture screen having aspect ratio of 9 to 16 without cutting off the both sides and reducing the video image processing speed suit to a wide mode if a wide mode, said speed conversion memory is successively connected to Y/C signal divider for dividing a time-divided and multiplex HDTV signal of MUSE standard into a luminance signal and a chrominance signal, and a vertical interpolation filter for a luminance signal for vertically interpolating the luminance video signal which is divided into by said Y/C divider and of which the processing speed is reduced, and in additions said Y/C signal divider is successively connected to a chrominance signal time expander for expanding the chrominance signal compressed by a fourth by four times in the time axis and a vertical interpolation filter for a chrominance signal for vertically interpolating the time-expanded chrominance signal, and a vertical compressor and a memory for converting the luminance signal interpolated by said vertical interpolation filter for a luminance signal and a chrominance signal interpolated by said vertical interpolation filter for a chrominance signal into number of scanning lines of a NTSC standard TV picture screen are respectively connected to the output stages of said vertical interpolation filters and for a luminance signal and for a chrominance signal and a digital/analog converter for converting the digital video signal converted by the frequency rate of NTSC standard TV signal into analog signal again and a NTSC encoder for encoding the analog luminance signal Y and analog chrominance difference signals R-Y and B-Y into a composite video signal and component video signal of NTSC standard, wherein said vertical interpolation filter for a luminance signal comprises a first horizontal line delay part for a luminance signal for delaying a luminance video signal by 1 line;

a second horizontal line delay part for a luminance signal for delaying the output of said first horizontal line delay part for a luminance signal by 1 line;

a first adder for adding a luminance video signal and said second horizontal line delay part for a luminance signal and dividing by 2;

a first data selector for selecting one of a luminance video signal and the output of said second horizontal line delay part for a luminance signal;

a second adder for adding the outputs of said first adder and said first data selector and dividing by 2;

a second data selector for selecting one of the outputs of said first and said second adders; and a third adder for adding the outputs of said first horizontal line delay part for a luminance signal and said second data selector and dividing by 2 and said vertical interpolation for a chrominance signal comprises a first horizontal line delay part for a chrominance signal for delaying a chrominance video signal by 1 line;

a second horizontal line delay part for a chrominance signal for delaying the output of said first horizontal line delay part for a chrominance signal by 1 line;

a third horizontal line delay part for a chrominance signal for delaying the output of said second horizontal line delay part for a chrominance signal by 1 line;

a fourth horizontal line delay part for a chrominance signal for delaying the output of said third horizontal line delay part for a chrominance signal by 1 line;

a fourth adder for adding the outputs of said first and said third horizontal line delay parts for a chrominance signal and dividing by 2;

a fifth adder for adding a chrominance video signal and the output of said fourth horizontal line delay part for a chrominance signal and dividing by 2;

a sixth adder for adding the outputs of said second horizontal line delay part for a chrominance signal and said fifth adder and dividing by 2;

a third data selector for selecting one of the outputs of said fourth and said sixth adders to output a B-Y signal; and a fourth data selector for selecting one of the outputs of said fourth and said sixth adders to output a R-Y signal.

BRIEF DESCRIPTION OF THE DRAWINGS

These and other objects of the invention will be better understood upon study of the Detailed Description of the Invention, below, together with the drawings in which:

FIG. 3 is a detailed block diagram of a vertical interpolation filter for a luminance signal according to the present invention.

FIG. 4 is a detailed block diagram of a vertical interpolation filter for a chrominance signal according to the present invention.

FIG. 6 is a diagram illustrating a factor and principle of a filter used for vertical interpolation of a luminance signal.

FIG. 7 is a diagram illustrating a factor and principle of a filter used for vertical interpolation of a chrominance signal.

DETAILED DESCRIPTION OF THE INVENTION

Hereinafter a MUSE/NTSC standard converter according to the present invention will be described in more detail with reference to the accompanying figures.

Figure 1:
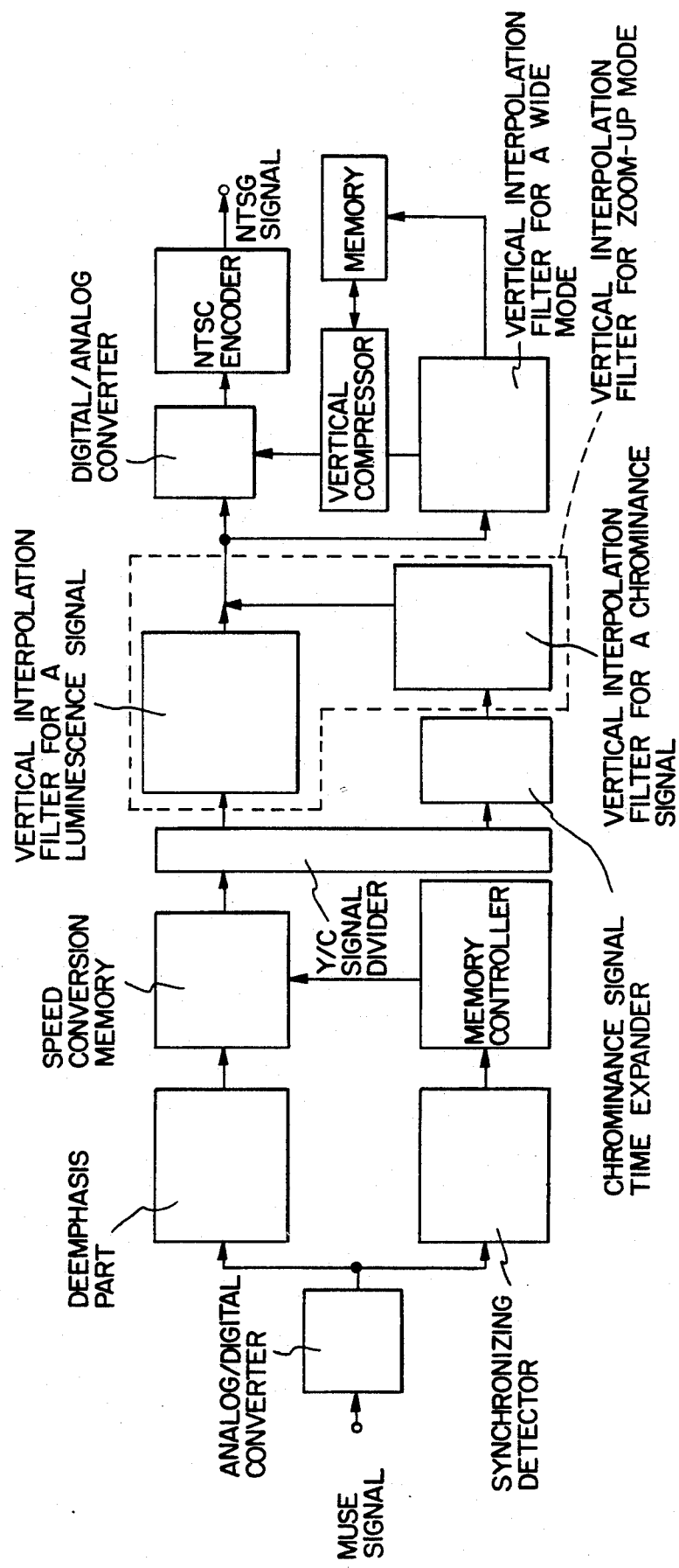
FIG. 1 is a block diagram illustrating configuration of a MUSE/NTSC standard converter according to the prior art.
Figure 2:
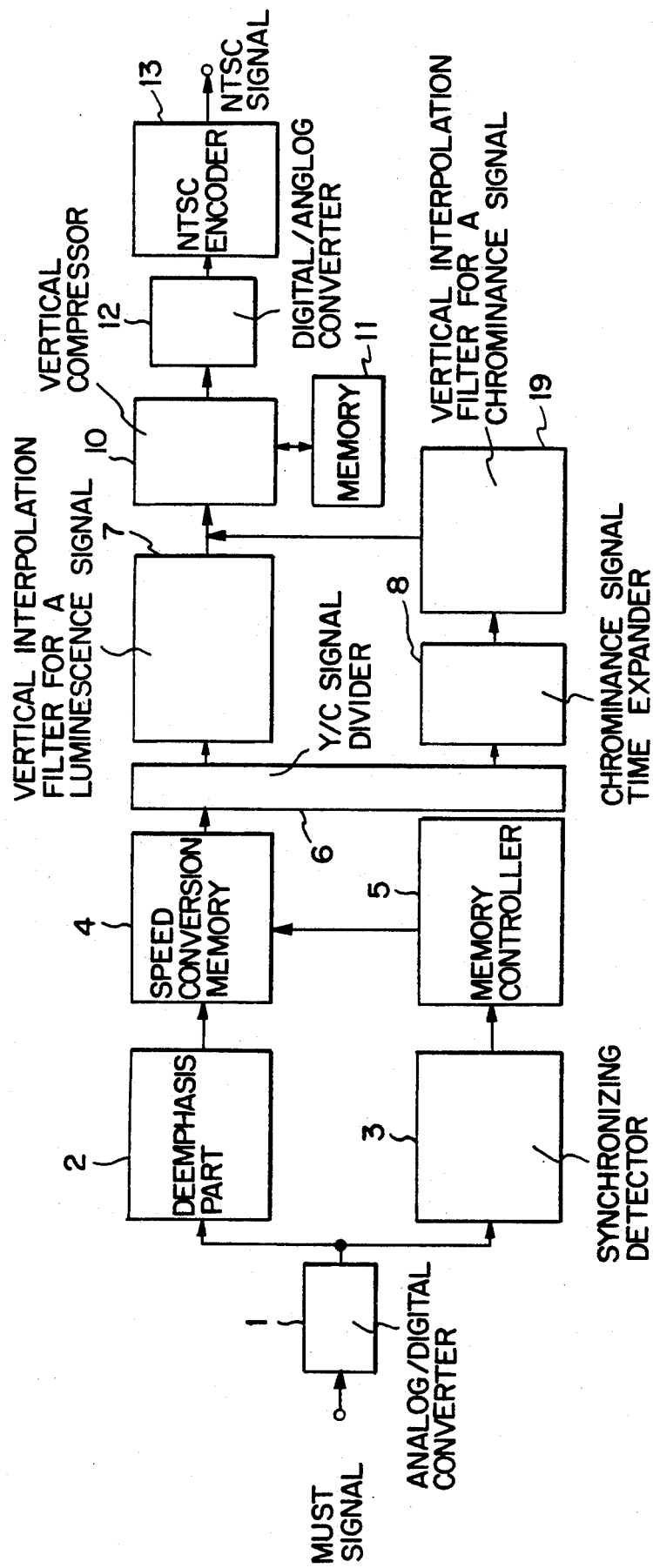
FIG. 2 is a block diagram illustrating configuration of a MUSE/NTSC standard converter according to the present invention.
Figure 5:
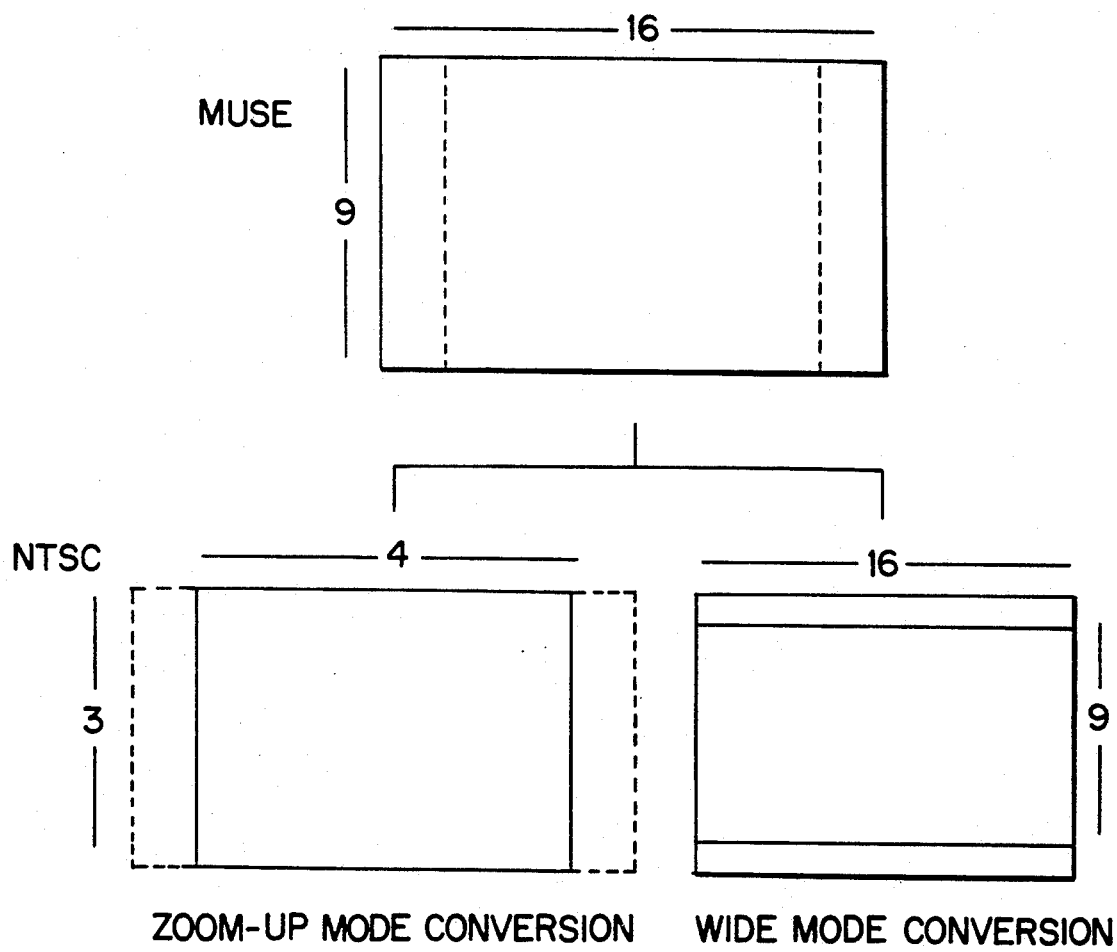
FIG. 5 is a configuration diagram of a picture screen according to the mode converted by a MUSE/NTSC standard converter.

FIG. 2 shows a MUSE/NTSC standard converter according to the present invention.

A HDTV signal of MUSE standard having aspect ratio of 9 to 16 is converted into a digital signal through the analog/digital converter 1 and then transmitted to the deemphasis part 2 and the synchronizing detecter 3, respectively.

In the deemphasis part 2 the transmission reverse r-treatment and deemphasis treatment against non-linear treatment accomplished in the MUSE encoder before the transmission are accomplished and the synchronizing detector 3 detects a horizontal and a vertical synchronizing signals of a MUSE signal and generates all kinds of reference signals such as a clock signal which is generated by a PLL (Phase Locked Loop).

On the other hand, the deemphasis treated-MUSE video signal is applied to the speed conversion memory 4 and in the speed conversion memory 4 the video signal inputted with the speed of a MUSE digital signal rate is converted into by signal rate for processing a NTSC image by the memory controller 5 which is driven by the clock applied to the synchronizing detector 3.

At this time, when the conversion mode is a zoom-up mode, a HDTV video signal having scanning lines of 1125 and aspect ratio of 9 to 16 is cut off by 15% in the both sides of a picture screen so that aspect ratio thereof is converted into 3 to 4 and number of scanning lines is vertically compressed into 1050 lines so that the rate of a video signal is reduced. While the conversion mode is a wide mode, a HDTV video signal having scanning lines of 1125 and aspect ratio of 9 to 16 is outputted as it is.

As above-mentioned, the MUSE video signal of which the speed is reduced is divided into a luminance signal and a chrominance signal through the Y/C signal divider 6 and the divided luminance signal is applied to the vertical interpolation filter 7 for a luminance signal configured as shown in FIG. 3 and the divided chrominance signal is expanded through the chrominance signal time expander 8 by four times and then is applied to the vertical interpolation filter 9 for a chrominance signal configured as shown in FIG. 4.

The vertical interpolation filter 7 for a luminance signal configured as shown in FIG. 3 vertically interpolates according to a zoom-up/wide mode as the principle as shown in FIG. 6.

If a zoom-up mode, the operation of the vertical interpolation filter 7 for a luminance signal is as follows.

Three horizontal lines $Ln-1$, $Ln$ and $Ln+1$ are generated from the luminance video signal inputted through the Y/C signal divider through the first and the second horizontal line delay parts 7-1 and 7-2. Among three horizontal lines, $Ln+1$ corresponding to the first horizontal line and $Ln-1$ corresponding to the third horizontal line are added and divided by 2 through the first adder 7-3 and the outputs of said first adder 7-3 and the first data selector 7-4 are added and divided by 2 through the second adder 7-5. Said first data selector 7-4 selects the third horizontal line $Ln-1$ if an odd field and selects the first horizontal line $Ln+1$ if an even field.

The output of the second adder 7-5 and the second horizontal line $Ln$ are added and divided by 2 through second adder 7-7 to be outputted as follows. If a zoom-up mode and an odd field, luminance signal: $\dfrac{Ln+1+4Ln+3Ln-1}{8}$ If a zoom-up mode and an even field, luminance signal: $\dfrac{3Ln+1+4Ln+Ln-1}{8}$ If a wide mode, the operation of said vertical interpolation 7 for a luminance signal is as follows.

The output of the first adder 7-3 as above described in the foregoing operation of a zoom-up mode is selected by the second data selector 7-6 which selects the data with reference to mode selection and it is added to the second horizontal line Ln through the third adder 7-7 and then divided by 2 to be outputted as follows.

If a wide mode, luminance signal: $\dfrac{Ln-1+2Ln+Ln-1}{4}$

The vertical interpolation filter 9 for a chrominance signal configured as shown in FIG. 4 vertically interpolates according to a zoom-up/wide mode as principle as shown in FIG. 7.

If a zoom-up mode, two chrominance difference signals R-Y and B-Y are differently interpolated through the vertical interpolation filter 9 for a chrominance signal according to an inputted odd field or even field.

First, when an odd field is inputted, if B-Y, five horizontal lines Ln−2, Ln−2, Ln, Ln+1 and Ln+2 are generated from a chrominance video signal inputted through the chrominance signal time expander 8 in the first through the fourth horizontal line delay parts 9-1, 9-2, 9-3 and 9-4 for a chrominance signal.

Among five horizontal lines, Ln+2 corresponding to the first horizontal line and Ln−2 corresponding to the fifth horizontal line are added and then divided by 2 through the fifth adder 9-6. The output of said fifth adder 9-6 and the third horizontal line Ln are added and divided by 2 through the sixth adder 9-7 and then it is outputted through the terminal A of the third data selector 9-8.

Similarly, when an odd field is inputted in a zoom-up mode conversion, if a R-Y signal, the second horizontal line Ln+1 and the fourth horizontal line Ln−1 are added and divided by 2 through the fourth adder 9-5 and the signal is outputted through the terminal A of the fourth data selector 9-9.

Therefore, when an odd field is inputted in a zoom-up mode conversion, the outputs of the vertical interpolation filter 9 for a chrominance signal aganist chrominance difference signals B-Y and R-Y are as follows.

If a zoom-up mode and an odd field, $B\text{-}Y$ singal: $\dfrac{Ln+2+2Ln+Ln-2}{4}$ If a zoom-up mode and an odd field, $B\text{-}Y$ singal: $\dfrac{Ln+1+Ln+1}{2}$ When an even field is inputted, if a zoom-up mode, the operation of vertical interpolation of chrominance difference signals is opposed to that in the case where an odd field is inputted in a zoom-up mode as aforesaid.

Repeatedly, if a R-Y signal, five horizontal lines Ln+2, Ln+1, Ln, Ln−1 and Ln−2 are generated from a chrominance video signal inputted through a chrominance signal time expander 8 in the first through the fourth horizontal line delay parts 9-1, 9-2, 9-3 and 9-4 for a chrominance signal.

Among five horizontal lines, Ln+2 corresponding to the first horizontal line and Ln+2 corresponding to the fifth horizontal line Ln−2 are added and divided by 2 through the fifth adder 9-6 and the output of said fifth adder 9-6 and the third horizontal line Ln are added and divided by 2 through the sixth adder 9-7 and it is outputted through the terminal B of the fourth data selector 9-9.

Besides, when an even field is inputted in a zoom-up mode conversion, if a B-Y signal, the second horizontal line Ln+1 and the fourth horizontal line Ln−1 are added and divided by 2 through the fourth adder 9-5 and the signal is outputted through the terminal B of the third data selector 9-8.

Therefore, if a zoom-up mode conversion, when an odd field is inputted, the outputs of the vertical interpolation filter 9 for a chrominance signal aganist chrominance signal difference signals B-Y and R-Y are as follows.

If a zoom-up mode and an even field, $B\text{-}Y$ signal: $\dfrac{Ln+1+Ln-1}{2}$ If a zoom-up mode and an even field, $R\text{-}Y$ signal: $\dfrac{Ln+2+2Ln+Ln-1}{4}$ If a wide mode, the operation of the vertical interpolation filter 9 for a chrominance signal is as follows.

According to the aforesaid operation of a zoom-up mode, the signals which are repectively applied to input terminals A and B of the third and the fourth data selectors 9-8 and 9-9 are as follows.

Input signal of the terminal A of data selectors 9-8 and 9-9:

$$\dfrac{Ln+2+2Ln+Ln-2}{4}$$

Input signal of the terminal B of data selectors 9-8 and 9-9:

$$\dfrac{Ln+1+Ln-1}{2}$$

Therefore, if a wide mode, when an odd field of a R-Y signal is outputted, the input of the terminal B of the third data selector 9-8 is first outputted and next the inputs of terminals A and B are alternately selected to be outputted every line. While an even field of a R-Y signal is outputted, the input of the terminal A of the third data selector 9-8 is first outputted and next the inputs of terminals A and B are alternately selected to be outputted every line.

Besides, when an odd field of a B-Y signal is outputted, the input of the terminal A of the fourth data selector 9-9 is first outputted and next the inputs of terminals A and B are alternately selected to be outputted every line and while an even field of a B-Y signal is outputted, the input of the terminal B of the fourth data selector 9-9 is first outputted and next the inputs of terminals A and B are alternately selected to be outputted every line.

Therefore, if a wide mode, the output of the vertical interpolation filter 9 for a chorominance signal 9 is as follows.

If a wide mode, the output of an odd field — an odd line of a $B$-$Y$ signal, an even field — an even line of a $R$-$Y$ signal, an odd field — an even line of a $B$-$Y$ signal and an even field — an odd line of a $R$-$Y$ signal:

$$\frac{Ln + 1 + Ln - 1}{2}$$

If a wide mode, the output of an odd field — an odd line of a $R$-$Y$ signal, an even field — an even line of a $B$-$Y$ signal, an odd field — an even line of a $R$-$Y$ signal and an even field — an odd line of a $B$-$Y$ signal:

$$\frac{Ln + 2 + 2Ln + Ln - 2}{4}$$

If a zoom-up mode, said outputs of the vertical interpolation filters 7 and 9 for a luminance signal and for a chrominance signal are vertically compressed through the vertical compressor 10 and the memory 11 for a vertical compression to be outputted one to every 2 lines and if a wide mode, they are vertically compressed to be outputted one to every 3 lines.

The vertically compressed video signal is converted into an analog signal through the digital/analog converter 12 and the analog signal is applied to the NTSC encoder 13 and converted as composite video signal or component video signal capable of watching through NTSC TV or NTSC monitor.

According to the aforesaid MUSE/NTSC standard converter for converting a signal of MUSE standard HDTV which is called as the next generation digital video apparatus to be watched through the present NTSC TV set, the configuration of apparatus is more simple than that in the pror art and if a wide mode, number of the converted vertical scanning lines can be improved from 350 line in the prior art to 375 lines so that the vertical resolution can be improved on the order of 7.5%.

While the invention has been particularly shown and described herein with reference to the preferred and other embodiments thereof, it will be understood by those skilled in the art that various modifications and changes may be made to the instant invention utilizing the principles of the invention as described herein without departing from the spirit and scope thereof as encompassed in the accompaying claims. Therefore, it is intended in the accompanying claims to cover all such equivalent variations as come within the scope of the invention as described.

What is claimed is:

1. A MUSE/NTSC standard converter for converting a divided digital luminance signal and chrominance signal into a video signal by vertical interpolation filters to output a television broadcasting standard, comprising:

a vertical interpolation filter for a luminance signal including horizontal line delay parts for successively delaying the divided luminance signal as an input by 1 H;

a first adder for adding said inputted luminance signal and the output of said horizontal line delay part;

a first data selector for switching two inputs of said first adder according to a field signal;

a second adder for adding the outputs of said data selector and said first adder;

a second data selector for switching the outputs of said first and said second adders according to a mode signal;

and a third adder for adding the outputs of said horizontal line delay part and said second data selector;

a vertical interpolation filter for a chrominance signal including horizontal line delay parts for successively delaying the divided chrominance signal as an input by 1 H;

a fourth adder for adding the outputs of said horizontal line delay parts;

a fifth adder for adding said inputted chrominance video signal and the output of said horizontal line delay part;

a sixth adder for adding the outputs of said horizontal line delay part and said fifth adder; and data selectors for switching the outputs of said fourth and said sixth adders according to said mode signal.

2. A MUSE/NTSC standard converter for converting a MUSE system television signal to an NTSC system television signal comprising:

an analog-to-digital converter for converting an analog MUSE baseband signal from a tuner into a predetermined digital MUSE signal;

a deemphasizing means for reversely treating against a transmitting r-treatment and an emphasizing treatment accomplished before transmission of said MUSE baseband signal;

a synchronizing detector for accurately detecting a synchronizing signal of said digital MUSE signal;

a speed converting means for cutting off both sides of an HDTV picture screen which has an aspect ratio of 9 to 16 to make an NTSC picture screen having an aspect ratio of 3 to 4 and then reducing a video image processing speed to suit to a zoom-up mode when being in said zoom-up mode, and for maintaining an HDTV picture screen which has an aspect ratio of 9 to 16 without cutting off both sides thereof and then reducing the video image processing speed to suit a wide mode when being in said wide mode;

a Y/C signal divider for dividing a time-divided and multiplexed HDTV signal of MUSE standard applied from said speed converting means into a luminance signal and a chrominance signal;

a first interpolating filter for vertically interpolating said luminance signal divided by said Y/C signal divider;

a time expander for expanding the chrominance signal applied from the Y/C signal divider in a time axis and providing a time-expanded chrominance signal;

a second interpolating filter for vertically interpolating said time-expanded chrominance signal;

a compressing means for converting said luminance signal interpolated by said first interpolating means and said chrominance signal interpolated by said second interpolating means into a number of scanning lines of an NTSC standard;

a digital-to-analog converter for converting a digital signal applied from said compressing means to a digital video signal converted by a frequency rate of the NTSC system television signal into a corresponding analog signal; and an NTSC encoder for encoding said corresponding analog signal into a composite video signal of the NTSC standard.

3. The MUSE/NTSC standard converter of claim 2, wherein said first interpolating filter comprises:

a first horizontal line delaying means for successively delaying a divided luminance signal as an input two times by 1 H;

a first adder for adding said divided luminance signal and a first delayed signal in which the divided luminance signal is delayed a second time by means of said horizontal line delaying means in order to obtain a second delayed signal;

a first data selector for switching two inputs of said first adder in response to a field selecting signal;

a second adder for adding the outputs of said data selector and said first adder;

a second data selector for switching the outputs of said first and said second adders in response to a mode selecting signal; and a third adder for adding said first delayed signal in which the divided luminance signal is delayed a first time by means of said horizontal line delaying means and the output of said second data selector.

4. The MUST/NTSC standard converter of claim 2, wherein said second interpolating filter comprises:

a second horizontal line delaying means for successively delaying said time-expanded chrominance signal four times by 1 H;

a fourth adder for adding two delayed signals in which said time-expanded chrominance signal is delayed a first and a third time by means of said second horizontal line delaying means;

a fifth adder for adding said time-expanded chrominance signal from said time expander and a delayed signal in which said time-expanded chrominance signal is delayed a fourth time by means of said second horizontal line delaying means;

a sixth adder for adding a signal from said fifth adder and a delayed signal in which said time-expanded chrominance signal is delayed a third time by means of said second horizontal line delaying means; and a third data selector for switching outputs of said sixth adder in response to said mode selecting signal.

5. A MUSE/NTSC standard converter for converting a MUSE system television signal to a NTSC system television signal comprising:

an analog-to-digital converter for converting an analog MUSE baseband signal from a tuner into a predetermined digital MUSE signal;

a deemphasizing means for reversely treating against a transmitting r-treatment and an emphasizing treatment accomplished prior to transmission of said MUSE baseband signal;

a synchronizing detector for accurately detecting a synchronizing signal of said digital MUSE signal;

a speed converting means for cutting off both sides of an HDTV picture screen which has an aspect ratio of 9 to 16 to make an NTSC picture screen having an aspect ratio of 3 to 4 and then reducing a video image processing speed to suit to a zoom-up mode when being in said zoom-up mode, and for maintaining an HDTV picture screen which has an aspect ratio of 9 to 16 without cutting off both sides thereof and then reducing said video image processing speed to suit a wide mode when being in said wide mode;

a Y/C signal divider for dividing a time-divided and multiplexed HDTV signal of MUSE standard applied from said speed converting means into a luminance signal and a chrominance signal;

a first interpolating filter for vertically interpolating said luminance signal divided by said Y/C signal divider;

said first interpolating filter comprising:

a first horizontal line delaying means for successively delaying said divided luminance signal as an input two times by 1 H;

a first adder for adding said divided luminance signal and a delayed signal in which said divided luminance signal is delayed a second time by means of said horizontal line delaying means;

a first data selector for switching two inputs of said first adder in response to a field selecting signal;

a second adder for adding the outputs of said data selector and said first adder;

a second data selector for switching the outputs of said first and said second adders in response to a mode selecting signal; and a third adder for adding said first delayed signal in which said divided luminance signal is delayed a first time by said horizontal line delaying means and an output of said second data selector;

a time expander for expanding said chrominance signal applied from said Y/C signal divider in a time axis and providing a time-expanded chrominance signal;

a second interpolating filter for vertically interpolating said time-expanded chrominance signal;

said second interpolating filter comprising:

a second horizontal line delaying means for successively delaying said time-expanded chrominance signal four times by 1 H;

a fourth adder for adding two delayed signals in which said time-expanded chrominance signal is delayed a first and a third time by means of said second horizontal line delaying means;

a fifth adder for adding said time-expanded chrominance signal from said time expander and a delayed signal in which said time-expanded chrominance signal is delayed a fourth time by means of said second horizontal line delaying means;

a sixth adder for adding an added signal from said fifth adder and said delayed signal in which said time-expanded chrominance signal is delayed a third time by means of said second horizontal line delaying means;

a third data selector for switching outputs of said sixth adder in response to said mode selecting signal;

a compressing means for converting said luminance signal interpolated by said first interpolating means and said chrominance signal interpolated by said second interpolating means into a number of scanning lines of an NTSC standard;

a digital-to-analog converter for converting a digital signal applied from said compressing means as a digital video signal converted by a frequency rate of an NTSC system television signal, into a corresponding analog signal; and an NTSC encoder for encoding said corresponding analog signal into a composite video signal of the NTSC standard.

* * * * *